United States Patent [19]

Genz et al.

[11] Patent Number: 4,671,056
[45] Date of Patent: Jun. 9, 1987

[54] PULSE-SONIC JET NOZZLE

[76] Inventors: Matthew L. R. Genz, 4445 Delbrook Rd., North Vancouver, British Columbia, Canada, V7N 4A6; Bruce Villman, 2990 Sunnyside Rd., Port Moody, British Columbia, Canada, V3H 3C8

[21] Appl. No.: 893,884

[22] Filed: Aug. 6, 1986

[51] Int. Cl.⁴ .............................................. F02G 1/00
[52] U.S. Cl. .................................... 60/39.77; 60/247; 431/1; 34/191
[58] Field of Search ............ 431/1; 60/247, 249, 60/39.77; 34/191

[56] References Cited

U.S. PATENT DOCUMENTS

| | | | |
|---|---|---|---|
| 2,647,365 | 8/1953 | Myers | 60/270.1 |
| 2,738,646 | 3/1956 | Kadosch et al. | 60/39.77 |
| 2,743,575 | 5/1956 | Brzozowski | 60/39.77 |
| 2,812,635 | 11/1957 | Le Foll et al. | 60/249 |
| 2,919,542 | 1/1960 | Servanty et al. | 60/261 X |
| 2,970,430 | 2/1961 | Curtis et al. | 60/247 |
| 3,266,252 | 8/1966 | Hughes | 60/39.77 |
| 3,456,441 | 7/1969 | Graber | 60/247 |
| 3,462,955 | 8/1969 | Lockwood et al. | 60/249 |
| 3,592,395 | 7/1971 | Lockwood | 34/57 X |
| 3,618,655 | 11/1971 | Lockwood | 159/4 E |
| 4,033,120 | 7/1977 | Kentfield | 60/249 |

*Primary Examiner*—Margaret A. Focarino

[57] ABSTRACT

An improved valveless pulse jet combustor having an air inlet pipe connected to a combustion chamber having ignition means and fuel supply means is disclosed. The combustion chamber is further connected to an exhaust pipe. The combustion chamber is connected to the air inlet pipe via tapered fitting means adapted to receive relief port means, fuel injection means and compressed air inlet means directed towards the center of the chamber. Adjustable orifice flanges are positioned between the combustion chamber and an extension of the exhaust pipe. The inlet pipe and the tapered means have diverging interior diameters, the combustion chamber a converging interior diameter and the extension and exhaust pipe have diverging interior diameters such that in operation, backward thrust is directed through the release port means thereby reducing back flow through the inlet pipe.

7 Claims, 4 Drawing Figures

PULSE-SONIC JET NOZZLE

FIELD OF THE INVENTION

This invention relates to a pulse jet combustors and more particularly to an improved valveless pulse jet resonating combustor.

DESCRIPTION OF THE PRIOR ART

Pulse jet combustors and motors have been used in various applications ranging from jet engines to artic heaters. The basic valveless pulse jet combustor is comprised of an elongated hollow tube open at its ends and turned upon itself into a generally U-shaped configuration with the open ends thereof facing in the same direction. Fuel is introduced into the engine through a nozzle structure located at a section of the tube generally referred to as the combustion chamber. A sparking device is also located at such combustion chamber. An air inlet pipe is connected at one end of the combustion chamber and an exhaust pipe at its other end. In operation, once the proper fuel and air mixture has entered the combustion chamber, and the sparking device is energized to ignite the mixture, the consequent expansion of gases within the combustion chamber results in a gaseous discharge to the open ends of the engine producing thrust forces tending to propel the engine in the direction opposite to the direction of flow of the gaseous discharge.

Improvements in the construction of pulsatory combustion chambers have seen the replacement of mechanical inlet valves by valveless combustors, that is to say arrangements consisting of simple tubular members which are constantly open but are formed in such a manner that their resistance to the flow of air towards the combustion chamber is very much lower than their resistance to the flow of gases from the combustion chamber to the atmosphere.

However, so far, most valveless combustors had the inevitable escape of gases to the atmosphere from the exhaust end as well as a counter-thrust through the air inlet end which acts in opposition to the propulsive thrust produced by the jet. So far, no prior art pulse jet combustors have been designed in order to eliminate or at least reduce the amount of counter thrust produced at the air inlet pipe.

Most prior art pulse jet combustors have been designed for use in jet engines. Therefore, counter-thrust which acts in opposition to the propulsive thrust was basically redirected by means of a U-shaped exhaust extension such that the exhaust and air inlet pipe are basically parallel to one another. In general, in most of the prior art valveless pulse jet combustors, approximately 60% of the heat generated in the combustion chamber resonates out the exhaust pipe and 40% flows in the opposite direction as a counter-thrust backing out of the inlet pipe.

The tube configuration of pulse jet combustors can be in a straight line or have a 180° return shape the majority of which are the latter. A linear or straight line pulse jet combustor is disclosed in U.S. Pat. No. 2,647,365. It basically comprises a fuel air mixing chamber having an air inlet passage and a conventional fuel inlet. The mixing chamber is connected to a combustion tube having a conventional electrical ignition means located adjacent the exhaust end of the tube. In operation, air is introduced into the mixing chamber during the negative or low pressure cycle of the motor. Fuel is injected into the mixing chamber, continuously through the inlet. The air-fuel mixture then enters the combustion tube through a constriction. Initially, the charge is fired by the spark plug, then after the motor is firing in resonance, the spark plugs are disconnected and subsequent ignition of the motor follows from the flash back of each proceeding explosion. The mixed fuel air burns backward from the spark or exhaust end of the combustion tube, building up pressure progressively until it reaches the constriction where the wave front then reverses its direction and moves forward again through the tube toward the exhaust end creating a low pressure area in the mixing chamber thus completing the combustion cycle.

U.S. Pat. No. 2,657,780 discloses a pulse jet motor fuel inlet valve construction for introducing the combustion mixture into the combustion chambers of resonant pulse jet motors.

U.S. Pat. No. 2,919,542 discloses a cowling arrangement which enables the slowing down effect to be obtained in the flow of air in the vicinity of the air intake of the pulse jet unit or thermo propulsive discharge nozzle.

U.S. Pat. No. 2,812,635 teaches the use of a pulse engine with a rearwardly opening air inlet. The invention overcomes the detrimental effects of the gas escape through the aero dynamic valve or any other type of admission device of an impulse jet, without it being necessary to provide a tubular recovery member. The patent teaches the advantages of situating a 180° bend at a part of the impulse jet at which the gas in movement has a relatively low velocity i.e. at the junction of the combustion chamber and the exhaust nozzle, in a zone at which the expansion of the gases is still not entirely complete.

U.S. Pat. Nos. 3,091,324; 3,456,441; and 4,033,120, disclose and teaches various improvements for pulse jet combustors.

As indicated previously, none of these prior art pulse jet combustors have been able to substantially reduce the amount of counter-thrust that exists at the air inlet pipe after the fuel air mixture has been ignited.

The applicant, through experimentation, has discovered that with the introduction of compressed air before the combustion chamber, a more positive flow through the exhaust pipe section has been achieved. Hence, while in operation, instead of the gases backing out the inlet pipe, a limited amount escapes through a relief port to greatly enhance the performance. Applicant has achieved a 90% flow rate through the exhaust pipe section as opposed to 60% in the prior art and a 10% back flow through the relief port with relatively no gases backing out through the inlet pipe.

Also, sonic noise has been known to be prominent in prior art jet pulse combustors. Applicant has discovered that by providing a pulse jet unit of reduced size, in which both the length of the inlet leg and the outlet leg are the same, a substantial reduction in noise level has been achieved.

Additionally, applicant has found that by the addition of a set of adjustable orifice flanges directly after the combustion chamber, a variety of fuel in the combustion chamber can be used by adjusting the size of the flanges.

SUMMARY OF THE INVENTION

It is therefore an object of the present invention to provide an improved pulse jet combustor with a substantial increase in efficiency.

Another object of the present invention is to provide an improved pulse jet combustor which will substantially reduce the amount of noise while in operation.

In yet another object of the present invention is to provide an improved pulse jet combustor able to use a variety of fuel.

This invention therefore provides an improved valveless pulse jet combustor having an air inlet pipe connected to the combustion chamber, having ignition means and fuel supply means, said combustion chamber being further connected to an exhaust pipe, the improvement comprising: said combustion chamber being connected to said inlet pipe via tapered fitting means adapted to receive relief port means, fuel injection means and compressed air inlet means directed towards the centre of said chamber; adjustable orifice flanges positioned between said combustion chamber and an extension of said exhaust pipe; and wherein said inlet pipe and said tapered means have diverging interior diameters, said combustion chamber a converging interior diameter and said extension and exhaust pipe have diverging interior diameters such that in operation, backward thrust is directed through said relief port means thereby reducing back flow through said inlet pipe.

DRAWINGS

Particular embodiments of the invention will be understood in conjunction with the accompanying drawings in which.

DESCRIPTION OF THE PREFERRED EMBODIMENTS

Figure 1:
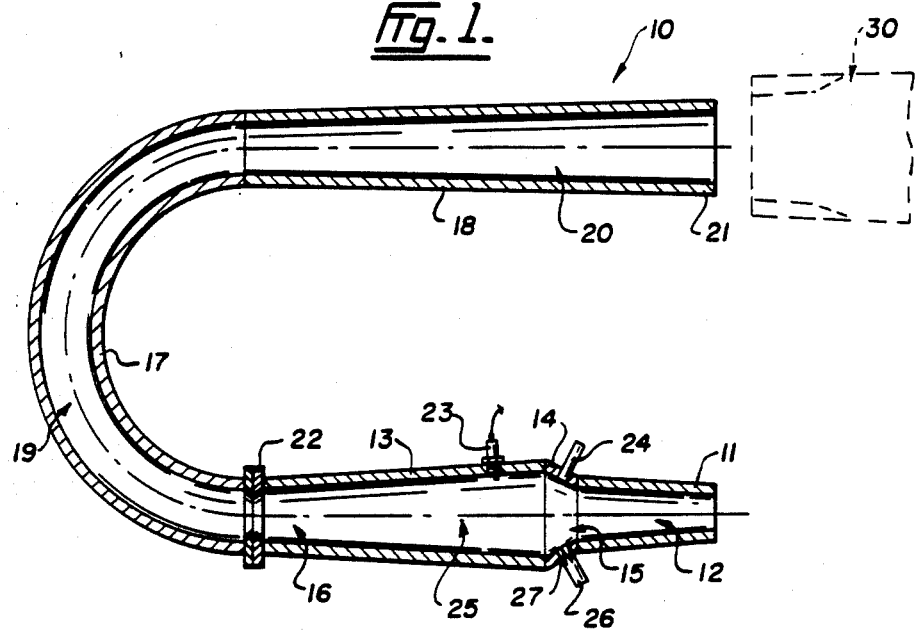
FIG. 1 is a cross sectional view of the improved valveless pulse jet combustor of the present invention.

Referring now to FIG. 1 we have shown at reference numeral 10 the basic elements that form the improved pulse jet resonating combustor of the present invention. An air inlet pipe 11 having a diverging interior diameter 12 is connected to combustion chamber 13 via a tapered fitting 14 having a diverging interior diameter 15. The interior diameter 16 of combustion chamber 13 is converging towards an extension pipe 17 connecting exhaust pipe 18 therewith. The interior diameters 19 and 20 of extension pipe 17 and exhaust pipe 18 respectively, are diverging outwardly towards the exhaust end 21 of exhaust pipe 18. A set of adjustable flanges 22 is positioned between extension pipe 17 and combustion chamber 13. These can consist of a pair of sliding metal plates able to constrict the interior diameter of said combustion chamber.

Figure 2:
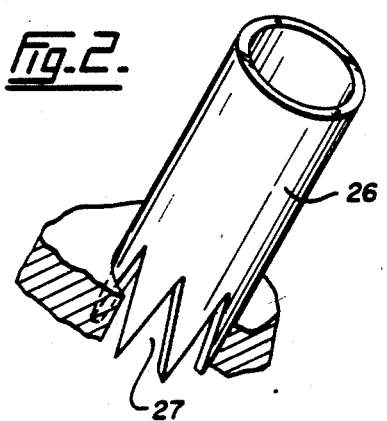
FIG. 2 is a partially sectioned view of the compressed air inlet and relief port.
Figure 4:
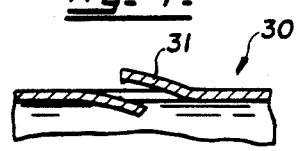
FIG. 4 is a surface cross section thereof.

The combustion chamber is provided with an igniting device such as a spark plug 23 to ignite the fuel and air mixture present in the chamber. Fuel is injected in the centre of the chamber by means of a nozzle 24 and will mix with the atmospheric air drawn from the air inlet pipe 11 into the centre of the chamber 25. The forward flow of gases is enhanced through the use of a compressed air inlet 26 which will reduce the amount of gases backing out through inlet pipe 11 after ignition. In this embodiment, the compressed air inlet 26 is provided with a series of openings as more clearly shown in FIG. 2 which act as relief ports to allow a percentage of expanding gases to be relieved through these ports rather than through the inlet pipe 11. The use of the relief port 27 in combination with a combustion chamber 13 having a converging interior diameter 16 an air inlet pipe 11 having a diverging interior diameter 12 and a tapered fitting 14 also having a diverging interior diameter 15 results in a valveless pulse jet combustor of improved efficiency. In the embodiment of FIG. 2, the relief port 27 is located at the compressed air inlet 26, however, the relief port could also be positioned elsewhere around tapered fitting 14.

In operation, air is drawn from the tapered air inlet 11 into the combustion chamber 13 where fuel is injected through nozzle 24. The fuel and air mixture is then ignited by means of spark plug 23 while compressed air is introduced into combustion chamber 13 by means of inlet 26 thereby enhancing the forward flow of the fuel and air mixture and the resultant explosive gases through the pipe extension 17 and exhaust pipe 18. Upon leaving the combustion chamber 13, the burnt gases will create an area of low pressure in the combustion chamber thereby allowing more outside air to be drawn into the combustion chamber by means of the air inlet pipe 11. Upon igniting the mixture, the compressed air and relief port allow 10% of these expanding gases to be relieved. Accordingly, the main or 90% of the thrust of the pulse jet is directed towards the exhaust pipe and not through the air inlet pipe 11.

More specifically, due to the kinetic energy of the mass of gases discharged, a pressure vacuum will be created in the combustion chamber 13 so that fresh air will rush into the combustion chamber. Simultaneously, fuel nozzle 24 will deliver a fresh quantity of fuel and the cycle described will be repeated. After some time the temperature in the combustion chamber 13 has been increased so much that the fuel air mixture will be ignited by itself without the aid of the electric spark plug 23.

It can be readily observed that the frequency of the combustion will be determined by the flow of compressed air through inlet 26 as well as injection of fuel through nozzle 24. The adjustment of orifice flanges 22 enable the use of any fuel in combustion chamber 13 by adjusting the size of the flanges. A user can run the combustor on propane, methane or diesel fuel and will require less than one pound per square inch of gas pressure.

Since the pulse jet combustion is operating at high temperatures, in the order of 3000° F., high heat resistant material is required. High temperature steel or metal such as ASTM A297 grade HU or the like can be used.

The pulse jet combustor of the present invention can be used for example in dehydration of food products such as fruits, vegetables, fish, yeast, spent grains, sludge and waste. Also, because of the high temperatures achieved in the combustion chamber and at the exhaust pipe, the pulse jet combustor can be used for burning harmful chemicals which otherwise would not be burnt or destroyed without creating harmful gases.

Figure 3:
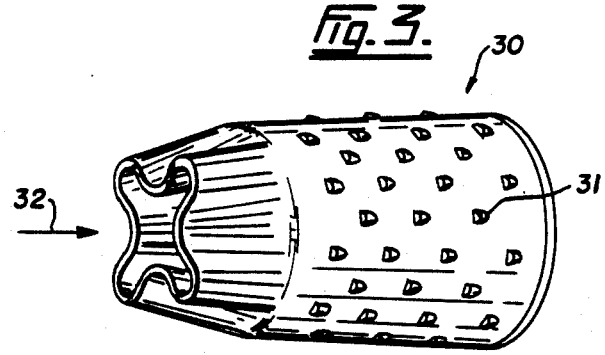
FIG. 3 is an isometric view of an attachment that can be used with the pulse jet combustor of the present invention for use in drying food products.

When used as a dehydrator, an augmentor is attached to the exhaust tail pipe of the pulse combustor. The product is then introduced in a liquid form through an inlet (not shown) and is dehydrated as it passes through the augmentor. Such an augmentor is shown at 30 in FIG. 3. The augmentor allows an introduction of cold outside air in the flow of hot gases thereby allowing a greater quantity of food product to be exposed to the hot gases from the exhaust pipe. This is achieved by the use of a series of slots 31 which will allow cooler outside air to be drawn into the augmentor and mixed with the hot gases 32 coming from the tail pipe of the combustor.

We claim:

1. An improved valveless pulse jet combustor having an air inlet pipe connected to a combustion chamber having ignition means and fuel supply means, said combustion chamber being further connected to an exhasut pipe, the improvement comprising:

said combustion chamber being connected to said air inlet pipe via tapered fitting means;

relief port means, fuel injection means and compressed air inlet means are fitted into said tapered fitting means and directed towards the centre of said chamber, the interior of said combustion chamber is converging towards an extension pipe, connecting said exhaust pipe with said combustion chamber;

adjustable orifice flanges positioned between said combustion chamber and said extension pipe;

and wherein said inlet pipe and said tapered means have diverging interior diameters, said combustion chamber a converging interior diameter and said extension and exhaust pipe have diverging interior diameters such that in operation, backward thrust is directed through said relief port means thereby reducing back flow through said inlet pipe.

2. A pulse jet combustor as defined in claim 1 wherein said relief port means is provided with said compressed air inlet means.

3. A pulse jet combustor as defined in claim 1 further comprising means positioned at said exhaust pipe to permit dehydration of food products by reducing the rate of flow of said product as it is exposed to hot gases produced by said combustor.

4. A pulse jet combustor as defined in claim 1 wherein the interior diameter of said tapered fitting is larger than the interior diameter of said air inlet pipe.

5. A pulse jet combustor as defined in claim 1 wherein said extension is U-shaped such that said exhaust pipe is generally parallel to said inlet pipe.

6. A pulse jet combustor as defined in claim 1 wherein said pulse jet combustor is made of heat resistant material such as ASTM A297 Grade HU.

7. A pulse jet combustor as defined in claim 1 wherein said adjustable orifice flanges comprises sliding metal plates to constrict the interior diameter of said combustion chamber.

* * * * *